United States Patent
Perry et al.

(10) Patent No.: US 10,890,870 B2
(45) Date of Patent: Jan. 12, 2021

(54) ITM DENT IDENTIFICATION UTILIZING INTEGRATED DEFECT MAPS

(71) Applicant: HP INDIGO B.V., Amstelveen (NL)

(72) Inventors: Oded Perry, Ness Ziona (IL); Oren Haik, Ness Ziona (IL); Avi Malki, Ness Ziona (IL)

(73) Assignee: HP INDIGO B.V., Amstelveen (NL)

( * ) Notice: Subject to any disclaimer, the term of this patent is extended or adjusted under 35 U.S.C. 154(b) by 0 days.

(21) Appl. No.: 16/487,731

(22) PCT Filed: Mar. 30, 2017

(86) PCT No.: PCT/EP2017/057561
§ 371 (c)(1),
(2) Date: Aug. 21, 2019

(87) PCT Pub. No.: WO2018/177527
PCT Pub. Date: Oct. 4, 2018

(65) Prior Publication Data
US 2020/0233355 A1    Jul. 23, 2020

(51) Int. Cl.
*G03G 15/00* (2006.01)
*G06T 7/00* (2017.01)

(52) U.S. Cl.
CPC .......... *G03G 15/5054* (2013.01); *G06T 7/001* (2013.01); *G06T 2207/30144* (2013.01)

(58) Field of Classification Search
CPC ............... G03G 15/0131; G03G 15/55; G03G 15/5058; G03G 15/5062; G03G 2215/00059
See application file for complete search history.

(56) References Cited

U.S. PATENT DOCUMENTS

| | | | |
|---|---|---|---|
| 2006/0067720 A1 | 3/2006 | Iwakura | |
| 2009/0079780 A1 | 3/2009 | Picciotto | |
| 2009/0274342 A1* | 11/2009 | Wu | G03G 15/0848 382/112 |
| 2011/0052228 A1* | 3/2011 | Kozitsky | G03G 15/5037 399/49 |
| 2012/0216689 A1 | 8/2012 | Cochran | |

(Continued)

FOREIGN PATENT DOCUMENTS

| | | |
|---|---|---|
| JP | 2002086690 | 3/2002 |
| JP | 5338215 | 11/2013 |
| JP | 2015155162 | 8/2015 |

OTHER PUBLICATIONS

Indigo Makes Its Move at Drupa 2012: Out in Width, Up in Throughput, and, Great Timing!, Mar. 12, 2012 < http://www.hp.com/hpinfo/newsroom/press_kits/2012/HPdrupa12/IT_Strategies_WP.pdf >.

*Primary Examiner* — Walter L Lindsay, Jr.
*Assistant Examiner* — Jessica L Eley
(74) *Attorney, Agent, or Firm* — HP Inc. Patent Department (57) ABSTRACT

In one example of the disclosure, a set of scanned images is accessed. The scanned images are scans of distinct printouts of subject images produced utilizing an intermediate transfer member. A set of defect maps is created by comparing the scanned images to reference data for the subject images. The set of defect maps are combined into an integrated defect map. A dent defect on the ITM is identified utilizing the integrated defect map.

15 Claims, 5 Drawing Sheets

(56) References Cited

U.S. PATENT DOCUMENTS

2013/0087059 A1    4/2013  Baird
2014/0079293 A1\*  3/2014  Kitai ................... H04N 1/6036
                                                        382/112
2017/0083734 A1\*  3/2017  Unemyr ............... G06K 7/1443

\* cited by examiner

ITM DENT IDENTIFICATION UTILIZING INTEGRATED DEFECT MAPS

BACKGROUND

A printing device may apply print agents to a paper or another substrate. One example of a printing device is a Liquid Electro-Photographic ("LEP") printing device, which may be used to print using a fluid print agent such as an electrostatic printing fluid. Such electrostatic printing fluid includes electrostatically charged or chargeable particles (for example, resin or toner particles which may be colorant particles) dispersed or suspended in a carrier fluid).

DETAILED DESCRIPTION

In an example of LEP printing, a printing device may form an image on a print substrate by placing an electrostatic charge on a photo image plate (a "PIP"), and then utilizing a laser scanning unit to apply an electrostatic pattern of the desired image on the PIP to selectively discharge the PIP. The selective discharging forms a latent electrostatic image on the PIP. The printing device includes a development station to develop the latent image into a visible image by applying a thin layer of electrostatic ink (which may be generally referred to as "LEP ink", or "electronic ink" in some examples) to the patterned PIP. Charged toner particles in the LEP ink adhere to the electrostatic pattern on the PIP to form a liquid ink image. The liquid ink image, including colorant particles and carrier fluid, is transferred from the PIP to an intermediate transfer member ("ITM" or "blanket"). The ITM is heated until carrier fluid evaporates and colorant particles melt, and a resulting molten film representative of the image is then applied to the surface of the print substrate via pressure and tackiness.

For printing with colored inks, the printing device may include a separate development station for each of the various colored inks. There are typically two process methods for transferring a colored image from the photoreceptor to the substrate. One method is a multi-shot process method in which the process described in the preceding paragraph is repeated a distinct printing separation for each color, and each color is transferred sequentially in distinct passes from the ITM to the substrate until a full image is achieved. With multi-shot printing, for each separation a molten film (with one color) is applied to the surface of the print substrate. A second method is a one-shot process in which multiple color separations are acquired on the ITM via multiple applications (each with one color) of liquid ink in from the PIP to the ITM, and then the acquired color separations are transferred in one pass from the ITM to the substrate.

The ITM is a consumable with a limited life span, and it should be replaced when it is damaged or aged. One of the most common issues with the ITM consumable is known as a dent defect, caused by one or more collisions involving the ITM and a PIP, a media or other surface in a manner that causes a dent damage at the ITM. As used herein, a "dent" refers generally to a hollow or impression in a surface made by a blow or exertion of pressure. In examples, the ITM dent may appear as a white feature, typically approximately 3 $mm^2$ to 10 $mm^2$, that is an area of the underlying media where ink was not dispersed due to the defect.

In order to save time and money for the customer and the provider of the LEP printing service, it is helpful to be able to distinguish ITM dent defects from other LEP press defects and operation errors. Commonly, the process of identifying a source of print errors can be a tedious manual process and can be error prone. Misdiagnosis of printing device errors can result in wasted time and resources as the operator may be replacing consumables that are still in good working order, with the replacements not addressing the true cause for the printing device not operating correctly.

To address these issues, various examples described in more detail below provide a system and a method that enables ITM dent identification utilizing integrated defect maps. In an example, a set of scanned images is accessed. Each of the scanned images is a scan of one of a set of distinct printouts of a subject image made at a printing device. The distinct printouts were produced utilizing a same ITM at the printing device. A set of defect maps is created, with each defect map being created by comparing one of the scanned images to digital reference data for the subject image. The comparisons may be performed patch versus patch where each patch received a score that represents its similarity to the reference patch which result in the defect map image. Brighter areas in a defect map represent a potential defect.

The set of defect maps are combined to form an integrated defect map. In examples, the integration may be of fifteen to twenty-five defect maps corresponding to consecutive frames printed by the printing device. In turn, the integrated defect map can be utilized to identify a dent defect on the ITM. In examples, a scanner, e.g., an inline scanner at the printing device, can be used to create the set of scanned images. In examples, the set of defect maps may be created by comparing brightness of correlated patches of the scanned images and of the subject images image according to the reference data, and assigning a score representing a similarity of a scanned image to a subject image. In examples, the comparing of scanned images to reference data for the subject image to create a defect map may include subtracting one of image attribute data for a scanned image and image attribute data for the subject image from the other, such that the calculated difference is indicative of degree of similarity.

In this manner the disclosed apparatus and method should significantly save time and resources for customers and printing device providers alike as identification of ITM dent defect errors will occur accurately and automatically. Users and providers of LEP printing systems will enjoy the cost savings made possible by the disclosed ITM dent identification apparatus and method, as ITM consumables will be replaced when needed as opposed to replacing ITM consumables as part of a troubleshooting exercise. Utilization and installations of LEP printing devices should thereby be enhanced.

Figure 1:
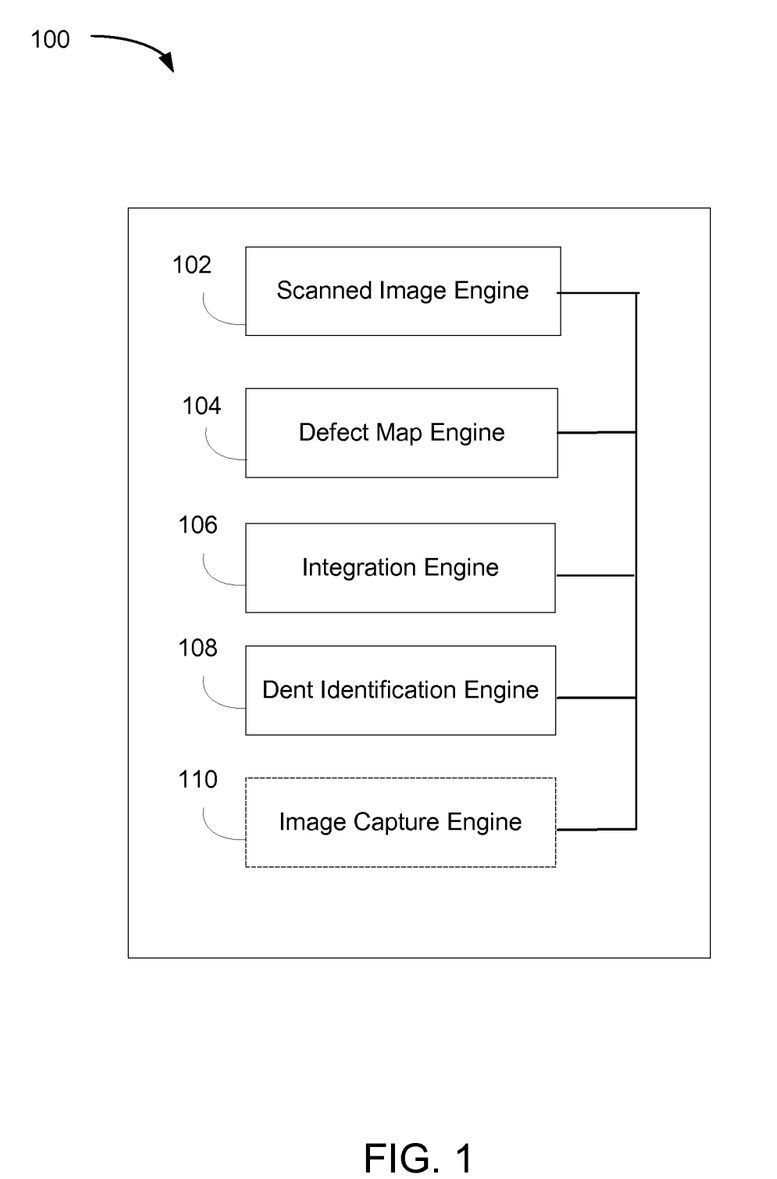
FIG. 1 illustrates an example of a system for identifying ITM dent defects utilizing integrated defect maps.
Figure 2:
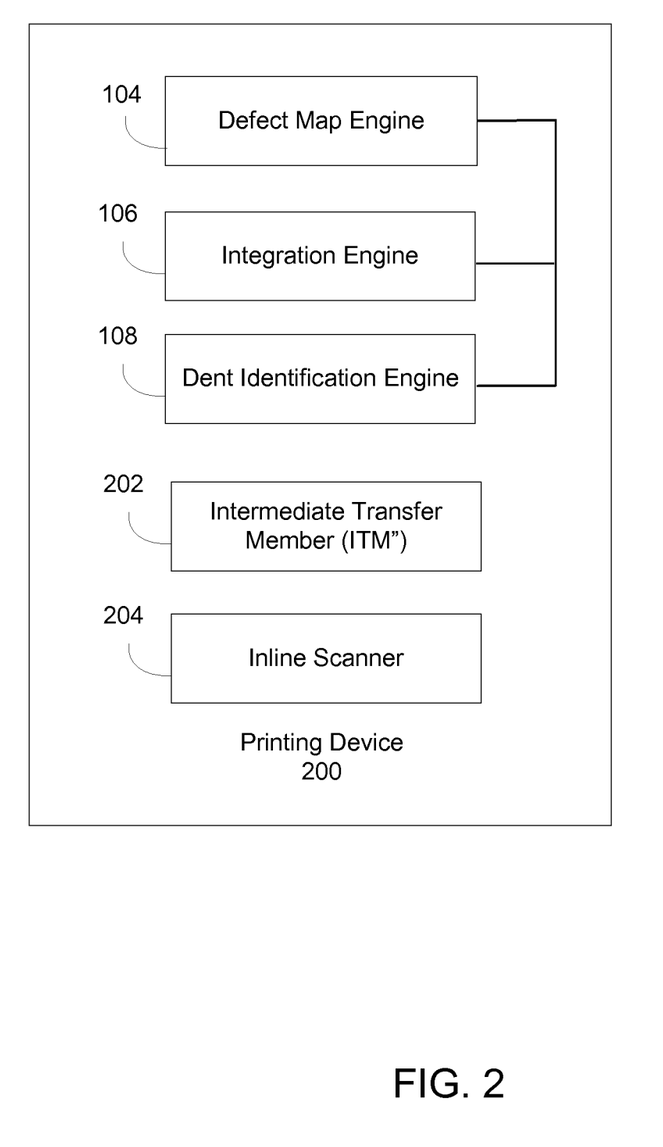
FIG. 2 is a block diagram depicting a printing device according to an example of the principles described herein.
Figure 3:
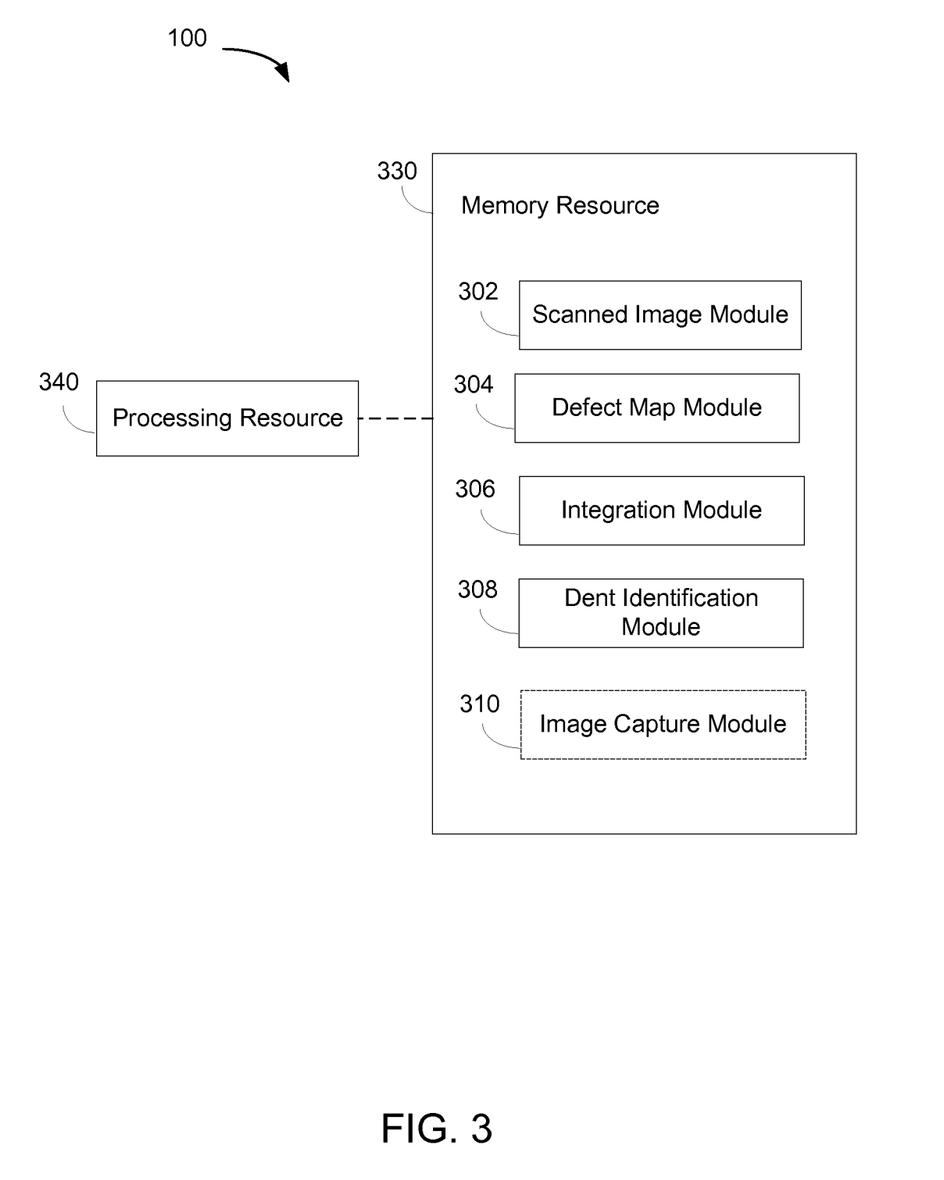
FIG. 3 is a block diagram depicting a memory resource and a processing resource to implement an example of a method of ITM dent defect identification utilizing integrated defect maps.

FIGS. 1-3 depict examples of physical and logical components for implementing various examples. In FIGS. 1 and 2 various components are identified as engines 102, 104, 106, 108, and 110. In describing engines 102-110 focus is on each engine's designated function. However, the term engine, as used herein, refers generally to hardware and/or programming to perform a designated function. As is illustrated with respect to FIG. 3, the hardware of each engine, for example, may include one or both of a processor and a memory, while the programming may be code stored on that memory and executable by the processor to perform the designated function.

FIG. 1 illustrates an example of a system 100 for ITM dent identification utilizing integrated defect maps. In this example, system 100 includes a scanned image engine 102, a defect map engine 104, an integration engine 106, and a dent identification engine 108. Certain examples may include an image capture engine 110. In performing their respective functions, engines 102-110 may access a data repository, e.g., a memory accessible to system 100 that can be used to store and retrieve data.

In an example, scanned image engine 102 represents generally a combination of hardware and programming to access a set of scanned images. Each of the scanned images is a scan of one of a set of distinct printouts of a subject image, wherein each of the printouts was produced utilizing a same ITM at a printing device. In certain examples, the scanning of the distinct printouts is accomplished utilizing an inline scanner at the printing device. As used herein "inline" refers generally to the scanner being located in the media path of the printing device. In some examples, the inline scanner may be a scanner that is situated in the media path of the printing device at a point after the creation of printouts, and before any post-printing activities such as laminating, winding (in the case of sheet fed media), or stacking (in the case of sheet media). In examples, the inline scanner may be one that is also utilized for color analysis (e.g., via spectrophotometry). In examples, the inline scanner may be one that is also utilized for image registration analysis, e.g. in guiding placement of images relative to each other or guiding placement of images relative to an edge or fiducial on a media.

In examples, scanned image engine 102 may access a set of scanned images that is between fifteen and twenty-five scanned images. In one example, the set of scanned images accessed may be a set of twenty scanned images. In a particular example, scanned image engine 102 may access a set of scanned images that is a set of twenty scanned image printed consecutively utilizing the same ITM and same printing device.

Defect map engine 104 represents generally a combination of hardware and programming to create a set of defect maps. Defect map engine 104 creates each defect map of the set by comparing one of the scanned images to reference data for the subject image. The resulting defect map is created in a manner that can be analyzed, e.g., via an applicable computer program, to identify defects in the scanned image relative to the subject image. In examples, defect map engine 104 is to create the set of defect maps by comparing correlated patches of the scanned images and reference data for the subject images. In some examples, defect map engine 104 is to create the set of defect maps by comparing brightness and/or contrast of correlated patches of the scanned images and reference data for the subject images. In some examples, defect map engine 104 may compare the correlated patches of the scanned images and of the subject images by assigning a score to each patch, with the scores representing a similarity to the subject image according to the reference data.

In certain examples, defect map engine 104 comparing one of the scanned images to reference data for the subject image may include a subtracting image attribute data for a scanned image from image attribute data for the subject image such that the calculated difference is indicative of degree of similarity. In other examples, defect map engine 104 may subtract image attribute data for the subject image from the image attribute data for the scanned image, with the calculated difference indicating degree of similarity.

Integration engine 106 represents generally a combination of hardware and programming to combine the set of defect maps into an integrated defect map.

Dent identification engine 108 represents generally a combination of hardware and programming to identify a dent defect on the ITM utilizing the integrated defect map. In some examples, dent identification engine 108 in identifying the dent defect, may identify within the integrated defect map a grouping of pixels that are at a predetermined luminosity level. The predetermined luminosity level in the integrated defect map occurs as a result of recurrence of the defect across the set of defect maps. In examples, the predetermined luminosity level is a result of recurrence of the being evident in each of the defect maps of the set of defect maps.

In particular examples, defect map engine 108 may obtain information as to a first set of pixels of the subject image that are pixels intended to be printed with a luminosity exceeding an accessed luminosity threshold. In these examples, defect map engine 108 may disregard this first set of pixels when analyzing the differences in pixels of the scanned image and of the subject image according to the reference data to create a defect map. In examples, defect map engine 108 may access a lookup table or database that includes the luminosity threshold.

As stated above, system 100 includes a scanned image engine 102 to access the set of scanned images. In certain examples, scanned image engine 102 may access these scanned images from a database or other location at which the scanned images have been stored. In some examples, these scanned images may be stored separate from the printing device that created the printouts. In other examples, system 100 additionally includes an image capture engine 110, representing generally a combination of hardware and programming to utilize a scanner to create the set of scanned images. In some examples, the scanner utilized to create the set of scanned images may be an inline scanner at the printing device. In examples, the inline scanner may be a multifunction scanner that is also utilized at the printing device for color analysis and/or image registration analysis.

FIG. 2 is a block diagram of a printing system 200 according to an example of the principles described herein. Printing device 200 includes an intermediate transfer member ("ITM") 202. The ITM 202 is for receiving an ink layer from a photoconductor, and for transferring ink layers to form printouts. In certain examples, ITM 202 may connected to a rotatable drum. In other examples, ITM 202 may be, or may situated upon, a continuous belt.

In examples, printing device 200 includes an inline scanner 204 to capture a set of scanned images. Each of the scanned images is a scan of one of a set of distinct printouts of a subject image that are produced at the printing device utilizing a same ITM 202. As used herein a "scanner" refers generally to an electromechanical device that captures an image of a subject. In examples, the inline scanner 204 is an optical scanner situated in the media path of the printing device such that scanning can occur during a printing process. As used herein, a "distinct printout" refers generally to an individual, or separately generated printout relative other generated printouts. In some use cases, the distinct printouts may be printouts of entirely different subject matters, e.g., a printouts of a skyline of a city, a printout of a sports photo, a printout of a product label, etc. In other use cases, one or all of the distinct printouts could be of a common subject.

Printing device 200 includes a defect map engine 104 to create a set of defect maps. In this example, each defect map is created by analyzing differences in pixels of a scanned image and of the reference data for the subject image. In examples, a defect map may analyze differences in pixels of a scanned image and determine that an unexpected a white feature is present. In some examples, an unexpected white feature in a printout at a size between 3 mm$^2$ to 10 mm$^2$ may indicative of a dent defect in the ITM that was used in creating the printout.

Printing device 200 includes an integration engine 106 to combine the set of created defect maps into an integrated defect map. In an example, the combining may include a process of adding image attribute data each of the set of created defect maps to create the integrated defect map. In this manner, areas of the set of scanned images that have a common defect may be identifiable according to a scoring of differences from a registration image indicating a significant difference.

Printing device 200 includes a dent identification engine 108 to identify a dent defect on the ITM utilizing the created integrated defect map. In a particular example, dent identification engine 108 may identify the dent defect by identifying within the integrated defect map a grouping of pixels at a predetermined level of brightness. The predetermined level of brightness may be one that is markedly brighter than other defects or anomalies noted in the integrated defect map, indicating a recurrence of the same defect at the same location in each of the printouts that were subjects of the set of scanned images.

In the foregoing discussion of FIGS. 1 and 2, engines 102-110 were described as combinations of hardware and programming. Engines 102-110 may be implemented in a number of fashions. Looking at FIG. 3 the programming may be processor executable instructions stored on a tangible memory resource 330 and the hardware may include a processing resource 340 for executing those instructions. Thus memory resource 330 can be said to store program instructions that when executed by processing resource 340 implement system 100 of FIGS. 1 and 2.

Memory resource 330 represents generally any number of memory components capable of storing instructions that can be executed by processing resource 340. Memory resource 330 is non-transitory in the sense that it does not encompass a transitory signal but instead is made up of a memory component or memory components to store the relevant instructions. Memory resource 330 may be implemented in a single device or distributed across devices. Likewise, processing resource 340 represents any number of processors capable of executing instructions stored by memory resource 330. Processing resource 340 may be integrated in a single device or distributed across devices. Further, memory resource 330 may be fully or partially integrated in the same device as processing resource 340, or it may be separate but accessible to that device and processing resource 340.

In one example, the program instructions can be part of an installation package that when installed can be executed by processing resource 340 to implement system 100. In this case, memory resource 330 may be a portable medium such as a CD, DVD, or flash drive or a memory maintained by a server from which the installation package can be downloaded and installed. In another example, the program instructions may be part of an application or applications already installed. Here, memory resource 330 can include integrated memory such as a hard drive, solid state drive, or the like.

In FIG. 3, the executable program instructions stored in memory resource 330 are depicted as scanned image module 302, defect map module 304, integration 306, dent identification module 308, and image capture module 310. Scanned image module 302 represents program instructions that when executed by processing resource 340 may perform any of the functionalities described above in relation to scanned image engine 102 of FIG. 1. Defect map module 304 represents program instructions that when executed by processing resource 340 may perform any of the functionalities described above in relation to defect map engine 104 of FIGS. 1 and 2. Integration module 306 represents program instructions that when executed by processing resource 340 may perform any of the functionalities described above in relation to integration engine 106 of FIGS. 1 and 2. Dent identification module 308 represents program instructions that when executed by processing resource 340 may perform any of the functionalities described above in relation to dent identification engine 108 of FIGS. 1 and 2. Image capture module 310 represents program instructions that when executed by processing resource 340 may perform any of the functionalities described above in relation to image capture engine 110 of FIG. 1.

Figure 4:
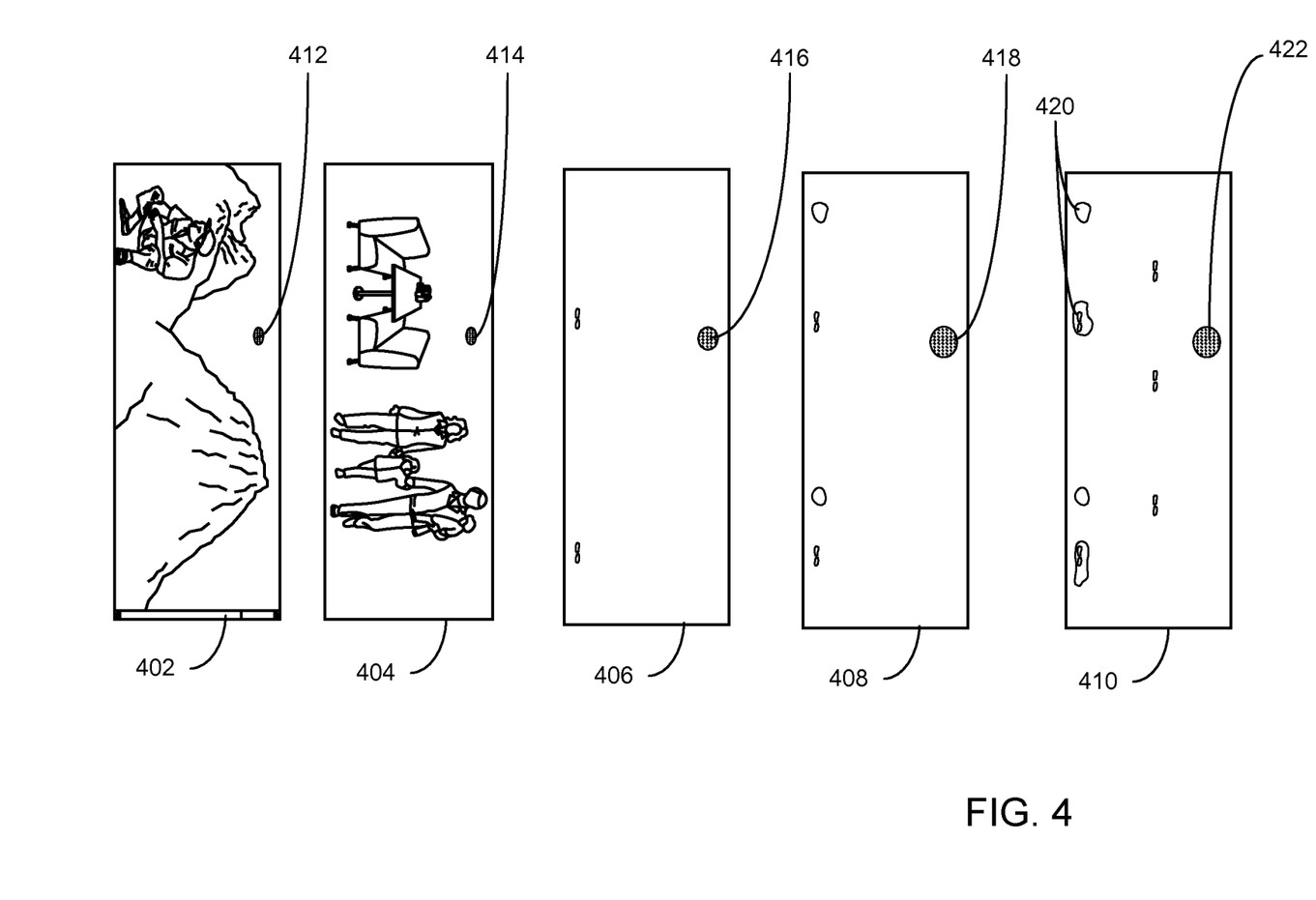
FIG. 4 illustrates identification of ITM dent defects utilizing integrated defect maps according to examples of the principles described herein.

FIG. 4 illustrates identification of ITM dent defects utilizing integrated defect maps according to an example of the principles described herein. In an example, a system 100 (FIG. 1) includes a scanned image engine 102 (FIG. 2) to access a set of scanned images including a first scanned image 402 and a second scanned image 404. First scanned image 402 and second scanned image 404 are scans of two of a set of distinct printouts of a subject image, wherein each of the printouts was produced utilizing a same ITM 202 (FIG. 2) at a printing device 200 (FIG. 202). In this example, the scanning of a first and second printout from printing device 200 to form the first and second scanned images 402 404, and the scanning of other distinct printouts from printing device 200 to form the rest of the set of scanned images is accomplished utilizing an inline scanner 204 (FIG. 2) at the printing device 200 (FIG. 2). The inline scanner may be an optical scanner that is situated in the media flow of the printing device at a point after the creation of printouts, and may be a scanner used for other printing device calibration routines, such as for color analysis or image to media registration. In this example, scanned image engine 102 accesses a set of scanned images that includes first and second scanned images 402 404 and approximately eighteen other scanned images that were printed consecutively using the same ITM and same printing device.

Continuing at FIG. 4, this example of system 100 (FIG. 1) includes a defect map engine 104 to create a set of defect maps including first defect map 406 and second defect map 408. Defect map engine 104 creates each of the set of defect maps by comparing one of the scanned images to reference data for the subject image. For instance, defect map engine 104 creates first defect map 406 by comparing first scanned image 402 to reference data for the subject image for first scanned image 402, and creates second defect map 408 by comparing second scanned image 404 to reference data for the subject image for second scanned image 404. The resulting first and second defect maps and the rest of the defect maps of the set are created in a manner that can be analyzed, e.g. via, an applicable computer program, to identify defects in the scanned image relative to the subject image.

In examples, defect map engine 104 may create first and second defect maps 406 408 by comparing correlated patches of the scanned images and reference data for the subject images, e.g., by comparing brightness and/or contrast of correlated patches of the scanned images and reference data for the subject images. In examples, defect map engine 104 may assign scores to correlated patch, with the scores representing a similarity to the correlated patches of the applicable subject image according to the reference data for the subject image.

In certain examples, defect map engine 104 comparing first and second scanned images 402 404 to reference data for their applicable subject images may include a subtracting of image attribute data for the scanned images from image attribute data for the applicable subject images such that the calculated difference is indicative of degree of similarity. In the example of FIG. 4, a first high luminosity area 416 is indicated as a regular, or irregular, oval shape in the illustration of a created first defect map 406, and a second high luminosity area 418 is indicated as a regular or irregular oval shape in the illustration of a created second defect map 408 indicate areas 412 414 of first scanned image 402 and second scanned image 404 that are significantly different than what was intended. These high luminosity, or bright, spots, or high scoring correlated areas may be identified as a result of a comparison of the first and second scanned images 402 404 with reference data for the subject images for the first and second scanned images 402 404.

Continuing at FIG. 4, this example of system 100 includes an integration engine 106 (FIG. 1) and a dent identification engine 108 (FIG. 1). Integration engine 106 is to combine first and second defect maps 406 408 (FIG. 4) and the other created defect maps into an integrated defect map 410.

Dent identification engine 108 is to identify a dent defect on the ITM 202 (FIG. 2) utilizing the created integrated defect map 410. In a particular example, dent identification engine 108 may identify the ITM dent defect by identifying within the integrated defect map 410 a grouping of pixels 422 that has a predetermined level of luminosity or brightness. In examples, dent identification engine 108 may access a lookup table or database that includes the luminosity threshold. In a particular example, the predetermined level of luminosity brightness is one that is 25% to 50% more luminous or brighter than other defects or anomalies 420 noted in the integrated defect map 410. In certain examples, dent identification engine 108 may provide a warning message or an instruction message to an operator of the printing device, to prompt the operator to initiate a timely and appropriate corrective action, including but not limited to replacing the damaged ITM.

Figure 5:
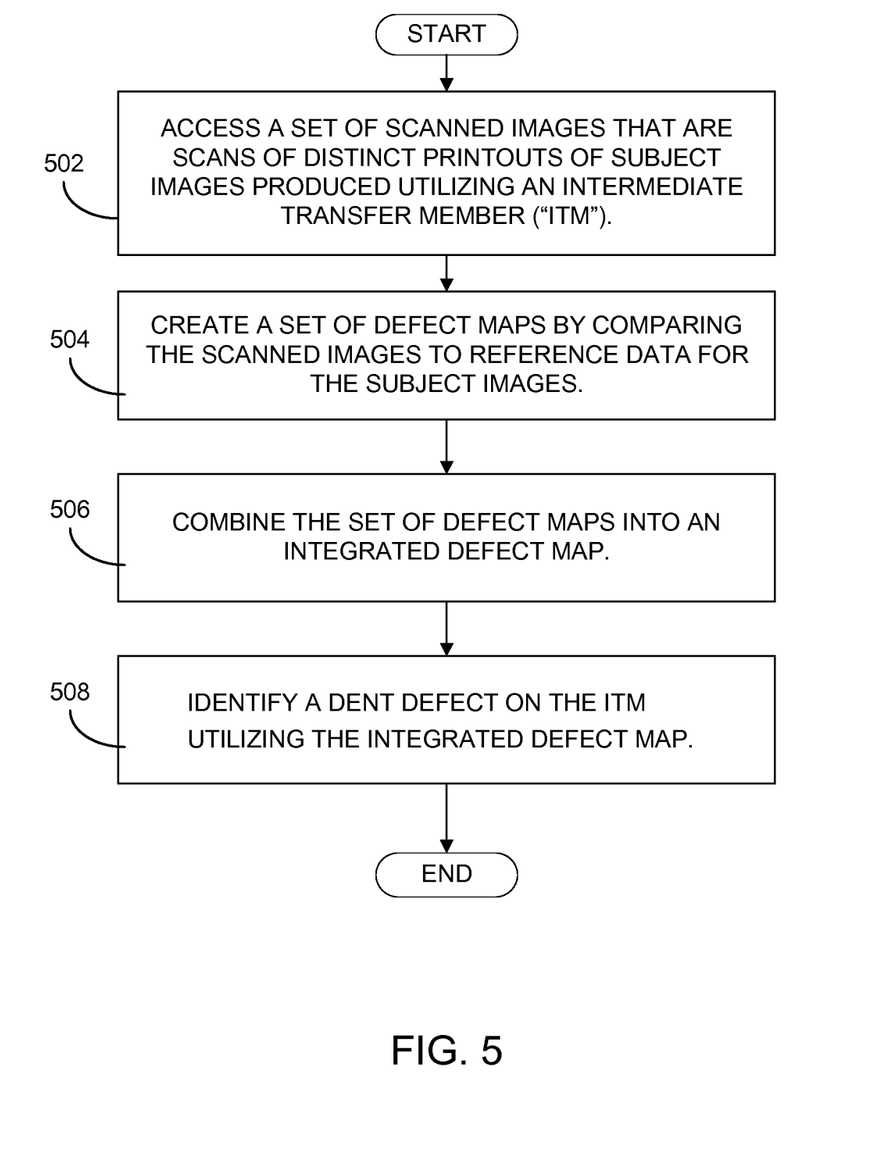
FIG. 5 is a flow diagram depicting implementation of an example of a method of ITM dent defect identification utilizing integrated defect maps.

FIG. 5 is a flow diagram of implementation of a method for ITM dent identification utilizing integrated defect maps. In discussing FIG. 5, reference may be made to the components depicted in FIGS. 1-3. Such reference is made to provide contextual examples and not to limit the manner in which the method depicted by FIG. 5 may be implemented. A set of scanned images is accessed. The scanned images are scans of distinct printouts of subject images produced utilizing an intermediate transfer member ("ITM") (block 502). Referring back to FIGS. 1-3, scanned image engine 102 (FIG. 1) or scanned image module 302 (FIG. 3), when executed by processing resource 340, may be responsible for implementing block 502.

A set of defect maps is created by comparing the scanned images to reference data for the subject images (block 504). Referring back to FIGS. 1-3, defect map engine 104 (FIGS. 1 and 2) or defect map module 304 (FIG. 3), when executed by processing resource 340, may be responsible for implementing block 504.

The set of defect maps are combined into an integrated defect map (block 506). Referring back to FIGS. 1-3, integration engine 106 (FIGS. 1 and 2) or integration engine module 306 (FIG. 3), when executed by processing resource 340, may be responsible for implementing block 506.

A dent defect on the ITM is identified utilizing the integrated defect map (block 508). Referring back to FIGS. 1-3, dent identification engine 108 (FIGS. 1 and 2) or dent identification module 308 (FIG. 3), when executed by processing resource 340, may be responsible for implementing block 508.

FIGS. 1-5 aid in depicting the architecture, functionality, and operation of various examples. In particular, FIGS. 1-3 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in a memory resource for use by or in connection with a processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is a non-transitory storage media that can contain, store, or maintain programs and data for use by or in connection with the instruction execution system. The term "non-transitory" is used only to clarify that the term media, as used herein, does not encompass a signal. Thus, the memory resource can comprise a physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory (EPROM), flash drives, and portable compact discs.

Although the flow diagram of FIG. 5 shows specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. All of the features disclosed in this specification (including any accompanying claims, abstract and drawings), and/or all of the blocks or stages of any method or process so disclosed, may be combined in any combination, except combinations where at least some of such features, blocks and/or stages are mutually exclusive. The terms "first", "second", "third" and so on in the claims merely distinguish different elements and, unless otherwise stated, are not to be specifically associated with a particular order or particular numbering of elements in the disclosure.

What is claimed is:

1. A system to a detect dent defect on an intermediate transfer member ("ITM"), comprising:
a scanned image engine, to access a set of scanned images, wherein each of the scanned images is a scan of one of a set of distinct printouts of a subject image, the distinct printouts produced utilizing an ITM at a printing device;
a defect map engine, to create a set of defect maps that include indicate areas, wherein each defect map is created by comparing one of the scanned images to reference data for the subject image;
an integration engine, to combine the set of defect maps into an integrated defect map to combine the indicate areas into luminosity areas; and
a dent identification engine, to identify a dent defect on the ITM utilizing the integrated defect map to identify a first luminosity area that is at a particular luminosity level outside of a second luminosity area intended to be printed with a luminosity level above a luminosity threshold, wherein the first luminosity area corresponds to the dent defect.

2. The system of claim 1, further comprising an image capture engine, to utilize a scanner to create the set of scanned images.

3. The system of claim 1, wherein the scanner is an inline scanner at the printing device that is also used for color analysis and/or image registration analysis.

4. The system of claim 1, wherein the set of scanned images is a set of between fifteen and twenty-five scanned images.

5. The system of claim 1, wherein the distinct printouts are printouts consecutively produced utilizing the ITM.

6. The system of claim 1, wherein the defect map engine is to create the set of defect maps by comparing correlated patches of the scanned images and of the subject images according to the reference data.

7. The system of claim 1, wherein the defect map engine is to create the set of defect maps by comparing brightness and/or contrast of correlated patches of the scanned images and reference data for the subject images.

8. The system of claim 1, wherein the defect map engine is to assign to the patches a score representing a similarity to the subject image according to the reference data.

9. The system of claim 1, wherein the defect map engine is to subtract one of image attribute data for a scanned image and image attribute data for the subject image from the other, such that the calculated difference is indicative of degree of similarity.

10. The system of claim 1, wherein the dent identification engine is to, in identifying the dent defect, identify within the integrated defect map a grouping of pixels that are at a predetermined luminosity level, the predetermined luminosity level being the result of recurrence of the defect in each of the defect maps of the set of defect maps.

11. The system of claim 1, wherein each of the scanned images contains a white feature, the white feature being indicative of an area of approximately 3 mm$^2$ to 10 mm$^2$ where ink was not dispersed on the printout due to an ITM dent defect.

12. The system of claim 1, wherein the defect map engine is to obtain information as to a first set of pixels of the subject image that are pixels intended to be printed with a luminosity exceeding an accessed luminosity threshold, and is to disregard the first set of pixels when analyzing the differences in pixels of the scanned image and of the subject image according to the reference data to create a defect map.

13. A printing device, comprising:
an intermediate transfer member ("ITM"), the ITM for receiving ink layers from a photoconductor, and for transferring ink layers to substrates to form printouts;
an inline scanner to capture a set of scanned images, wherein each of the scanned images is a scan of one of a set of distinct printouts of a subject image, the distinct printouts produced utilizing the ITM;
a defect map engine, to create a set of defect maps that include indicate areas, each defect map created by analyzing differences in pixels of a scanned image and of the reference data for the subject image;
an integration engine, to combine the set of defect maps into an integrated defect map to combine the indicate areas into luminosity areas; and
a dent identification engine, to identify a dent defect on the ITM utilizing the integrated defect map to identify a first luminosity area that is at a particular luminosity level outside of a second luminosity area intended to be printed with a luminosity level above a luminosity threshold, wherein the first luminosity area corresponds to the dent defect.

14. The printing device of claim 13, wherein the dent identification engine is to identify a dent defect on the ITM by identifying within the integrated defect map a grouping of pixels that are at a predetermined luminosity level, the predetermined luminosity level being the result of recurrence of the defect across the set of defect maps.

15. A method for detecting a dent defect on an intermediate transfer member ("ITM") of a printing device, comprising:
accessing a set of scanned images that are scans of distinct printouts of subject images produced utilizing an ITM;
creating a set of defect maps by comparing the scanned images to reference data for the subject images to identify indicate areas;
combining the set of defect maps into an integrated defect map to combine the indicate areas into luminosity areas; and
analyzing the integrated defect map to identify a dent defect on the ITM utilizing the integrated defect map to identify a first luminosity area that is at a particular luminosity level outside of a second luminosity area intended to be printed with a luminosity level above a luminosity threshold, wherein the first luminosity area corresponds to the dent defect.

* * * * *